(12) United States Patent
Stevenson

(10) Patent No.: US 6,737,570 B2
(45) Date of Patent: May 18, 2004

(54) INTERACTIVE PERSONAL AUDIO DEVICE

(75) Inventor: Alexander J. Stevenson, Dover, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/836,979

(22) Filed: Apr. 18, 2001

(65) Prior Publication Data

US 2002/0154577 A1 Oct. 24, 2002

(51) Int. Cl.⁷ .................................................. G10H 1/36
(52) U.S. Cl. ............................. 84/610; 84/601; 369/2
(58) Field of Search ..................... 369/4, 7, 12; 381/385

(56) References Cited

U.S. PATENT DOCUMENTS

| | | | | |
|---|---|---|---|---|
| RE28,999 E | * | 10/1976 | Southard ..................... 84/1.03 |
| 4,646,350 A | * | 2/1987 | Batra ........................... 381/51 |
| 4,876,724 A | * | 10/1989 | Suzuki ........................ 381/187 |
| 4,939,973 A | * | 7/1990 | Suzuki ........................ 84/605 |
| 5,206,842 A | * | 4/1993 | Spector ........................ 369/4 |
| 5,349,480 A | * | 9/1994 | Takao .......................... 360/74.1 |
| 5,383,079 A | * | 1/1995 | Takao .......................... 360/137 |
| 5,432,510 A | * | 7/1995 | Matthews .................... 341/20 |
| 5,475,835 A | * | 12/1995 | Hickey ........................ 369/2 X |
| 5,615,111 A | * | 3/1997 | Raskas et al. ............... 364/410 |
| 5,625,608 A | * | 4/1997 | Grewe et al. ................ 369/24 |
| 5,811,706 A | * | 9/1998 | Van Buskirk et al. ....... 84/604 |
| 5,811,708 A | * | 9/1998 | Matsumoto .................. 84/610 |
| 5,875,448 A | * | 2/1999 | Boys et al. .................. 705/531 |
| 5,986,200 A | * | 11/1999 | Curtin ......................... 84/609 |
| 6,025,553 A | * | 2/2000 | Lee ............................. 84/610 |
| 6,041,023 A | * | 3/2000 | Lakhansingh ................ 369/7 |
| 6,061,306 A | * | 5/2000 | Buchheim .................... 369/2 |
| 6,073,100 A | * | 6/2000 | Goodridge, Jr. ............. 704/258 |
| 6,164,853 A | * | 12/2000 | Foote .......................... 400/489 |
| 6,324,053 B1 | * | 11/2001 | Kamijo ........................ 361/683 |
| 6,392,133 B1 | * | 5/2002 | Georges ...................... 84/609 |
| 6,463,014 B1 | * | 10/2002 | Kanou et al. ................ 369/5 |

FOREIGN PATENT DOCUMENTS

JP        09-325777      * 12/1997      ............ G10H/7/02

OTHER PUBLICATIONS

Abstract of JP 09–325777 ( c) 1907 JPO.*

* cited by examiner

Primary Examiner—Aristotelis M. Psitos
(74) Attorney, Agent, or Firm—Trop, Pruner & Hu, P.C.

(57) ABSTRACT

A battery powered personal audio device may be carried by a user, for example in the user's palm or pocket. Touch operators may be provided with the personal audio device. The personal audio device may play back audio files such as compact disc or digital audio stream. The user may interject sounds or audio effects onto the ongoing playback of the audio by operating one or more touch operators.

10 Claims, 4 Drawing Sheets

INTERACTIVE PERSONAL AUDIO DEVICE

BACKGROUND

This invention relates generally to audio devices and particularly, battery powered or hand-held audio players that can be carried by the user.

A variety of portable audio players are currently available including compact disc players and digital audio players. Generally these devices are battery powered and light weight so that they may be carried in the user's hand or pocket. Commonly, the user may use headphones to listen to an audio output. Generally, the audio is in digital format, either on compact disc or stored in semiconductor memory.

Particularly with digital audio players, the sound quality may be relatively high. However, the opportunity for interactivity with the audio playback is relatively limited. Effectively, the user is relegated to simply listening to the audio while it is played back through headphones or otherwise.

In a variety of applications, interactivity may increase user enjoyment from electronic devices. For example, interactive television broadcasts enable users to participate with an ongoing television broadcast. It is believed that involving the users in the ongoing entertainment may enhance the experience of many entertainment forms to the user.

Thus, there is a need for a way to enable users to interact with personal audio devices.

DETAILED DESCRIPTION

Figure 1:
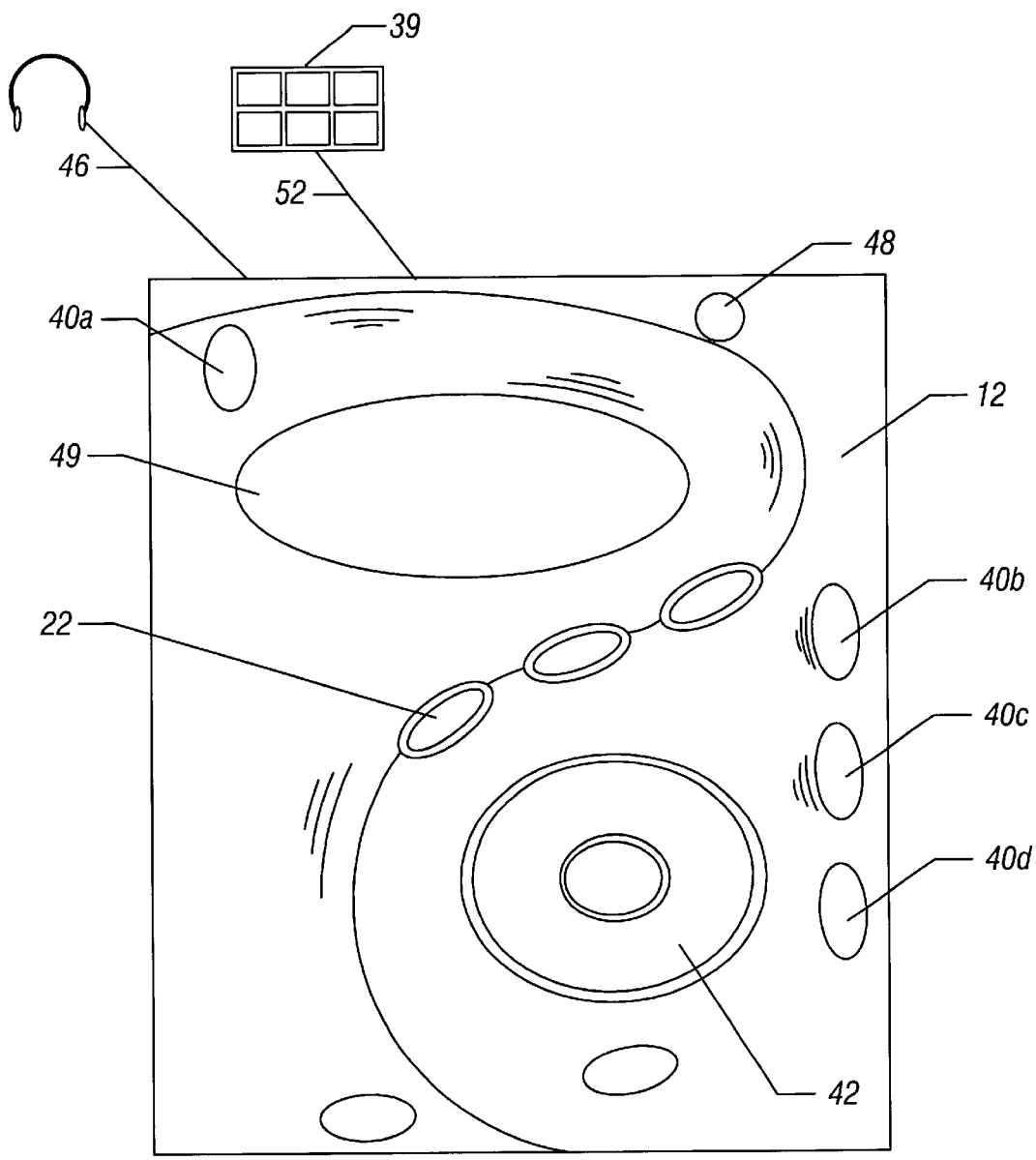
FIG. 1 is a front elevational view of one embodiment of the present invention.

Referring to FIG. 1, a personal audio device 10 may be a digital audio player, a compact disc player, a cassette tape player, a mini-disc player, or a digital audio tape player, or any device that is capable of reproducing audio. In some embodiments, the personal audio device 10 may be a device that plays back digital audio. However in other embodiments, the device may play back analog audio such as a cassette playback device or radio, as a couple of examples.

The personal audio device 10 is portable and battery powered. It may be palm-sized to fit in the user's palm or shirt pocket. Alternatively, the device 10 may be clipped to the user's clothing, such as the user's belt. Thus, the user can connect headphones indicated at 46 to the device 10 in order to listen to music or other audio information while the user walks around.

The personal audio device 10 may include a housing 12 with a plurality of controls including a set of manual operators 40. Each of the manual operators 40 may be a user touch selectable element. Examples of user touch selectable elements include display screen hot spots, capacitive sensors and pushbuttons.

In the embodiment illustrated in FIG. 1, a first operator 40a is positioned on the upper left corner of the device 10 and three operators 40b, 40c and 40d are positioned oppositely along the lower right edge of the device 10. Thus, when the device 10 body 12 is held in the user's palm, the thumb may be automatically positioned over the operator 40a while the user's fingers are positioned over the operators 40b–40d. Alternatively, the palm-sized device may be held in one hand and operated using the other hand.

The body 12 may also-include a built-in microphone 48. In one embodiment, the device 10 may be a player that plays a compact disc that is visible through a window 42. A display 49 may be provided to display information about an audio selection being played.

In addition to a connector for the headphones 46, the device 10 may also include a connector to an external device 39 by way of a cable 52. The device 39 may be a removable external device. Examples of such a removable device include a drum pad or a percussion generator. A drum pad includes a plurality of manual operators that may be touch-selected to generate analog signals. One drum pad is available from Hart Dynamics, Inc., Destin, Fla. 32541, under the brand name "Multipad 6 Trigger Pad." The analog signals generated by the drum pad may be coupled to the device 10 via an analog or digital interface. The device 10 may convert the analog signals into corresponding percussion sounds.

A mode selector switch 22 may be provided to select among options for the playback of different types of audio or entertainment modes, such as compact disc, MP3, flash memory, radio and the like.

During the course of playing an audio selection, the user can interact with the audio selection by pressing the touch operators 40. In particular, in response to actuation of any one or more of the operators 40, a sound or audio effect may be generated and mixed with the audio selection that is actually being played back. Then, the user may hear the audio selection modified or enhanced by the user's input commands.

Examples of user generated sound or effects may include percussion sounds, echo, reverb, flange, distortion, compression, equalization, and arpeggiation, to mention a few examples. In each case the user operation of an operator 40 may either add audio to or otherwise modify the ongoing audio playback.

For example, in accordance with one embodiment of the present invention, the user can simply tap on any of the operators 40 to trigger sound samples. These sound samples may be digital effects, instrument sounds, percussion sounds, audio effects or voice sounds, as a few examples. The sound samples may be automatically added to the playback of the audio source material.

The nature of the sounds that may be produced in response to actuation of the operators 40 may be subject to considerable variability. External or internal triggers may be operated to express information about the resulting sound. The user's expression, supplied through the triggers, may include varying the duration of the actuation as well as the attack and pressure of the actuation in one embodiment. The attack is the degree of strength of the initial contact on an operator 40. The pressure is how the operator 40 is pressed over time.

For example if the user presses lightly and then applies increasing pressure to an operator 40, the device 10 may-appropriately modify the resulting sound. After touch may also be interpreted as an input command in some embodiments. After touch is how hard the user presses the operator 40 after the initial press.

In one embodiment of the present invention, the personal audio device 10 may have a record function and may record audio through the microphone 48. This audio may then be mixed with the playback of audio, such as compact disc or digital audio. Thus, the user may record voices or other ambient sounds and, through selection of the operators 40, interject those sounds into the ongoing audio playback.

As an example, a user may record the voice of a friend through the microphone 48 and may then cause the voice sample to be played back by hitting an operator 40. Depending on how firmly the operator 40 is pressed, the volume of the playback may be controlled. In addition, the attack applied to the operator 40 may shift the pitch of the voice sample as played back. For example, if a harder attack is used, the voice sample may be played back at a higher pitch. If a softer attack is utilized, the voice playback may be at a lower pitch.

In still another embodiment, the user may obtain audio sounds for interjection and playback over a connection to the Internet. In one embodiment, a variety of different interesting sounds may be available for downloading to a personal computer over the Internet. Those files may then be transferred over an appropriate link from the personal computer to the personal audio device 10.

Figure 2:
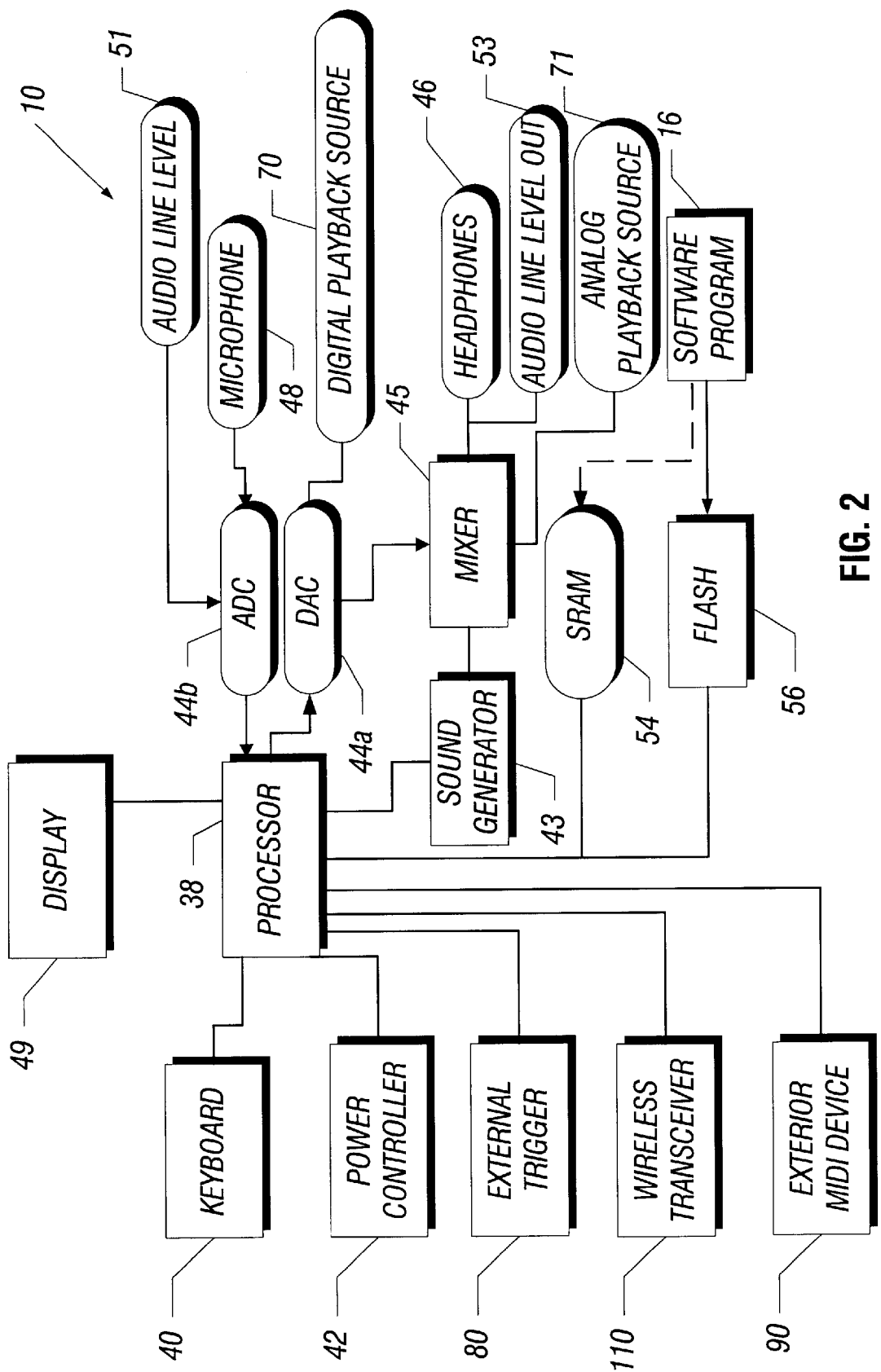
FIG. 2 is a block diagram for the device shown in FIG. 1 in accordance with one embodiment of the present invention.

Referring to FIG. 2, in accordance with one embodiment of the present invention, the personal audio device 10 may be implemented as a processor-based system including a processor 38. In one embodiment, the processor 38 may be the Intel® StrongArm™ processor or the Intel® Xscale™ processor available from Intel Corporation, Santa Clara, Calif. However, the personal audio device 10 may also be implemented as a non-processor-based device using specialized hardware to play audio selections, generate sounds and mix those sounds with the audio selection.

The processor 38 may be coupled to both the display 49 and the operators 40. Thus, the processor 38 may generate display information on the display 49 and may receive input commands through the touch operators 40. A power controller 42 may also be coupled to the processor 38 in order to provide control over battery power.

An analog to digital converter (ADC) 44b may be coupled to the processor 38 and to the microphone 48. Audio sounds received by the microphone 48 may be digitized by the ADC 44b and may be compressed under the control of processor 38 in one embodiment. Alternatively, the ADC 44b may receive audio data from an audio line level 51.

On-board memory may be provided in the form of static random access memory (SRAM) 54 and flash memory 56 in one embodiment. Either memory 54 or 56 may store a software program 16. Ambient sound information received via the microphone 48 or from an external device 39 may be stored as digital audio source material in the memory 54 or 56 in one embodiment.

In one embodiment, a sound generator 43 may be an integrated circuit separate from the processor 38. In other embodiments, the processor 38 may be responsible for generating the sounds.

Generated sounds from the sound generator 43 may then be mixed in a mixer 45 with the output from a digital to analog converter (DAC) 44a. Conventionally, the output from the DAC 44a may be the audio being played by an on-board audio player 70 or from the processor 38. The mixer 45 mixes the generated sounds, developed in response to operator 40 inputs, with an ongoing digital audio source from the DAC 44a or with an ongoing analog audio source 71. The mixer 45 outputs the mixed audio through an output buffer amplifier to drive the headphones 46 or an audio line level output 53, in one embodiment.

In some embodiments, a wireless transceiver 110, an external trigger interface 80, and exterior musical instrument digital interface (MIDI) device interface 90 may be coupled to the processor 38. See MIDI 1.0 Specification (1996) available from MIDI Manufacturing Association, Inc., La Habra, Calif. 90632-3173.

Figure 3:
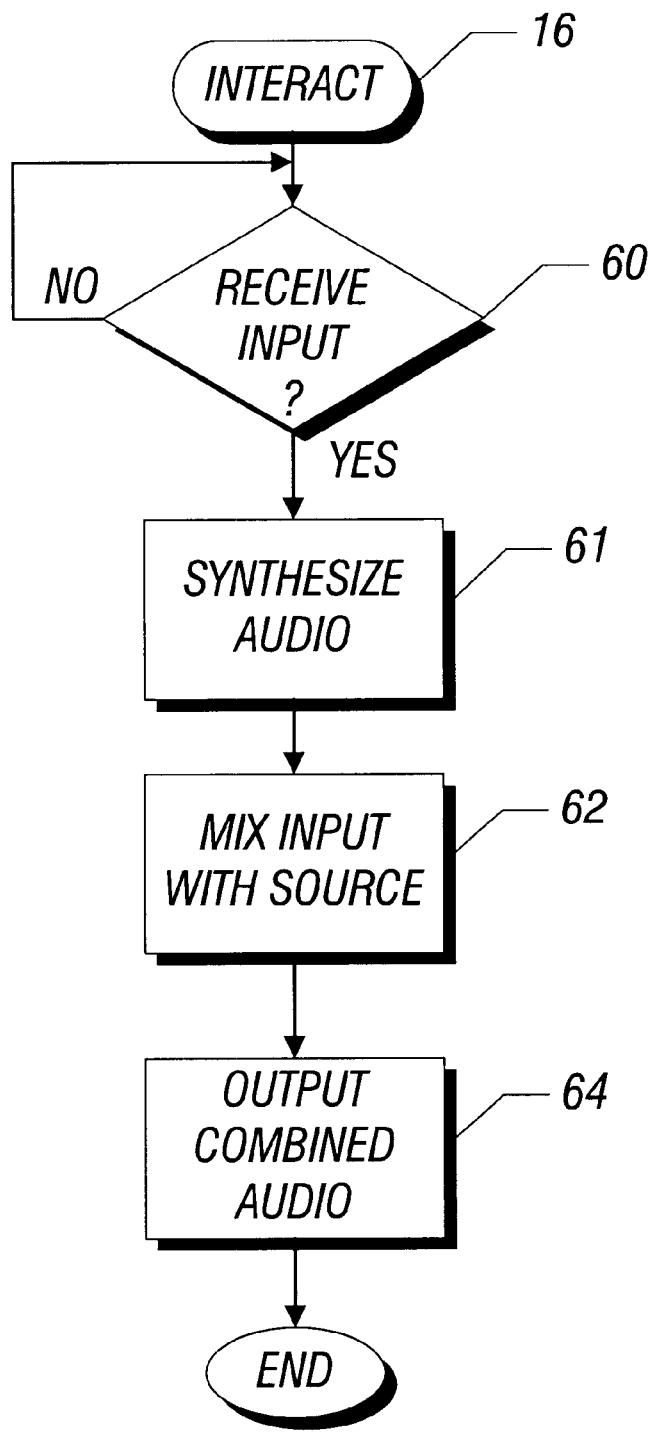
FIG. 3 is a flow chart for software that may be utilized in one embodiment of the present of the invention.

The software 16, shown in FIG. 3, in one embodiment, may be executed by the processor 38 to allow user interaction with ongoing audio playback. When an input command is received through an operator 40, as determined at diamond 60, the preprogrammed audio sound or effect associated with the selected operator 40, may be generated, as indicated in block 61. This may mean, in some embodiments, that one of a plurality of audio effects or sounds may be selected through an operator 40. The timing of the interjected audio and its expression may be controlled through the operation of the operator 40. In response thereto, the audio is synthesized corresponding to the user command and the command expression in one embodiment.

The input source audio, such as a compact disc or digital audio data stream file, may be decompressed and then mixed with the sound generator output as indicated in block 62. A combined digital audio stream is then output as indicated in block 64.

The processor 38, rather than the sound generator 43, may also control the generation of sounds in some embodiments. In particular, in response to operation of the operators 40, the processor 38 may initiate the generation of sounds using software. Each of the operators 40 may be user programmable, in one embodiment, with a user selected sound or effect being generated in response to actuation of the operator 40.

Figure 4:
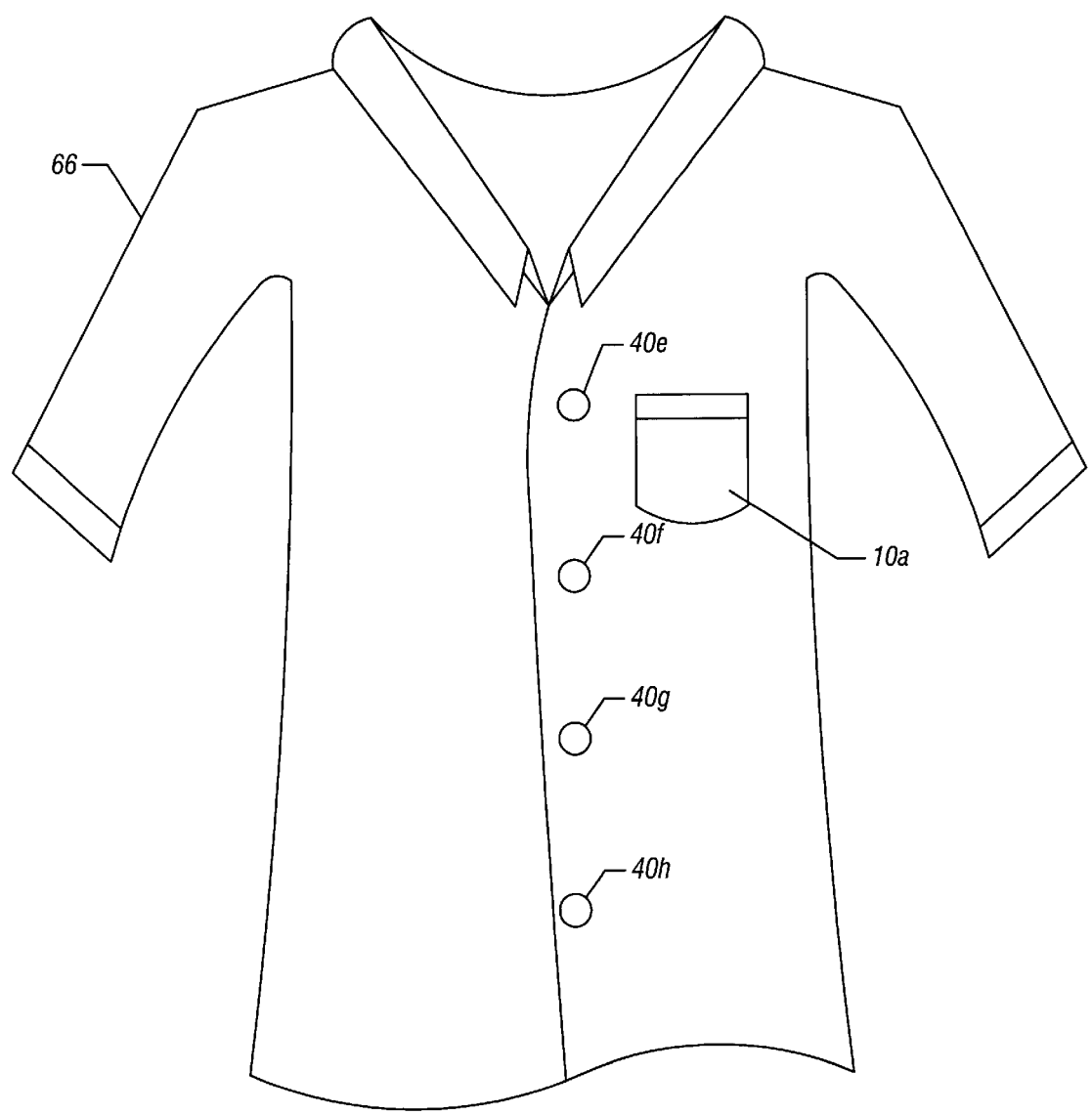
FIG. 4 is a front elevational view of still another embodiment of the present invention.

Referring to FIG. 4, in accordance with another embodiment of the present invention, the personal audio device 10a may be an article of clothing 66. In one embodiment, the article of clothing 66 may be a shirt. The body 12 may be contained in a pocket or attachment 10a on the shirt 66. The device 10a may couple via embedded wires, woven into the clothing 66, with a plurality of buttons 40e–h. Alternatively, a low power wireless transceiver 110 may be used to wirelessly couple the buttons 40e–h and the device 10a (i.e., through the transceiver 110 (shown in FIG. 2)). When the user touches any of the buttons 40e–h, audio effects or sounds may be mixed with the ongoing playback of audio.

Figure 5:
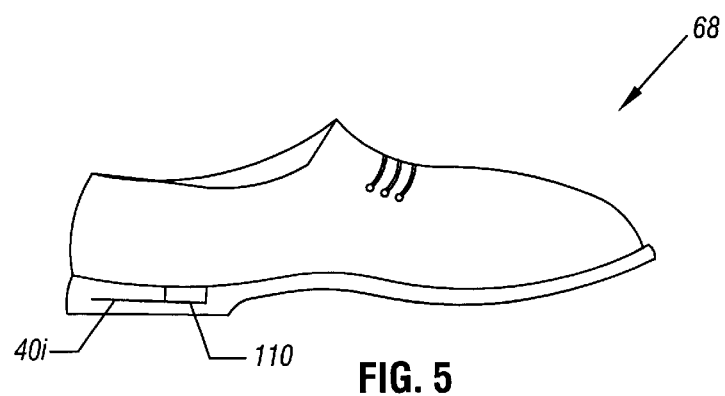
FIG. 5 is a side elevational view of yet another embodiment of the present invention.

Referring to FIG. 5, an operator 40i may be embedded into the heel of the shoe 68. Alternatively the operator 40i may be incorporated into the toe of the shoe 68. A wire may couple the operator 40i to the personal audio device 10. Alternatively, a low power radio frequency transceiver 110 may couple the operator 40i to the device 10 (i.e., through the transceiver 110 (shown in FIG. 2)).

As the user walks or undergoes dance steps, the user can control the generation of sounds or effects that may be added to or used to modify ongoing playback of audio. In particular, pressing on the shoe 68 may operate the operator 40i to trigger an audio sound or effect. In one embodiment a tap sound may be generated.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An electronic device comprising:

a palm shaped housing having a plurality of operators arranged to be automatically aligned beneath the user's thumb and fingers when the housing is held in the user's hand, a first of said operators being to play back a percussive sound, a second of said operators being to automatically record ambient sounds, and a third of said operators to play back an audio file;

a battery powered audio playback unit in said housing for playing audio files in response to the operation of the third of said operators;

a battery powered sound generator to generate a percussive sound in response to user activation of the first of said touch operators; and a mixer to automatically mix the audio from the audio files and the sound from the generator when the third and the first operators have been operated and to automatically generate an audio file and an ambient sound when both the second and the first operators have been operated.

2. The device of claim 1 wherein said playback unit includes a digital audio player.

3. The device of claim 1 wherein said playback unit includes a compact disc playback unit.

4. The device of claim 1 wherein said playback unit includes a radio playback unit.

5. The device of claim 1 wherein said playback unit includes a cassette player playback unit.

6. The device of claim 1 wherein said playback unit includes a digital audio tape playback unit.

7. The device of claim 1 wherein said playback unit includes a mini disc playback unit.

8. The device of claim 1 including a processor coupled to said operator to cause a sound to be generated in response to operation of said touch operator.

9. The device of claim 1 including a recording device to record ambient sounds and to playback those sounds when the touch operator is operated.

10. The device of claim 1 including a plurality of touch operators each programmed to generate different audio sounds when the operator is operated.

* * * * *